(12) United States Patent
Bade et al.

(10) Patent No.: US 7,816,832 B2
(45) Date of Patent: Oct. 19, 2010

(54) DIRECT DRIVE FOR LARGE-SCALE DRIVES

(75) Inventors: Maria Bade, Berlin (DE); Axel Möhle, Berlin (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/994,013

(22) PCT Filed: Jun. 21, 2006

(86) PCT No.: PCT/EP2006/063415

§ 371 (c)(1),
(2), (4) Date: Jul. 18, 2008

(87) PCT Pub. No.: WO2007/000403

PCT Pub. Date: Jan. 4, 2007

(65) Prior Publication Data

US 2009/0091210 A1 Apr. 9, 2009

(30) Foreign Application Priority Data

Jun. 27, 2005 (DE) .................... 10 2005 029 895

(51) Int. Cl.
   *H02K 1/12* (2006.01)
   *H02K 3/00* (2006.01)
   *H02K 1/00* (2006.01)
   *H02K 19/26* (2006.01)

(52) U.S. Cl. .................... 310/179; 310/180; 310/193

(58) Field of Classification Search .................. 310/259, 310/179–180, 193
See application file for complete search history.

(56) References Cited

U.S. PATENT DOCUMENTS

| 1,224,933 | A | 5/1917 | Jordan |
| 3,272,444 | A | 9/1966 | Rich et al. |
| 6,429,554 | B1 | 8/2002 | Albrich |
| 6,870,292 | B2 | 3/2005 | Owada |
| 2002/0113518 | A1 | 8/2002 | Hsu |
| 2002/0149281 | A1 | 10/2002 | Saint-Michel et al. |
| 2002/0175587 | A1* | 11/2002 | Vollmer .................. 310/179 |

FOREIGN PATENT DOCUMENTS

| DE | 10256735 A1 | 12/2003 |
| DE | 10058911 B4 | 1/2004 |

(Continued)

OTHER PUBLICATIONS

Machine Translation W02006058871A2 (2006).*

(Continued)

*Primary Examiner*—Quyen Leung
*Assistant Examiner*—Jose A Gonzalez Quinones
(74) *Attorney, Agent, or Firm*—Henry M. Feiereisen; Ursula B. Day

(57) ABSTRACT

The invention relates to a direct drive for large-scale drives, comprising a stator (1) which is configured, when seen from the peripheral direction, by a plurality of segments (3, 4, 5, 6), each having a self-contained winding arrangement, and a rotor which is configured from segments. The segments of the rotor are located on working elements that rotate with the rotor, and interact electromagnetically with a winding system of the stator (1). The inventive drive is especially suitable for ring motors and tube mill drives.

8 Claims, 2 Drawing Sheets

FOREIGN PATENT DOCUMENTS

| | | | |
|---|---|---|---|
| DE | 10225221 | A1 | 1/2004 |
| DE | 10228856 | A1 | 1/2004 |
| EP | 1093207 | A2 | 4/2001 |
| EP | 1246341 | A2 | 10/2002 |
| FR | 2823615 | A1 | 10/2002 |
| RU | 2094926 | C1 | 10/1997 |
| RU | 2145142 | C1 | 1/2000 |
| SU | 1252867 | A1 | 8/1986 |
| WO | WO 2006058871 | A2 * | 6/2006 |

OTHER PUBLICATIONS

Musil Von R; "Stand Der Entwicklung Des Ringmotors Zum Getriebelosen Antrieb Von Schwerkraftmühlen", Siemens Zeitschrift, Erlangen, DE, Bd. 49, Nr.8, 1975, Seiten 542-546.

* cited by examiner

DIRECT DRIVE FOR LARGE-SCALE DRIVES

BACKGROUND OF THE INVENTION

The invention relates to a direct drive for large-scale drives with a stator comprising segments and a rotor comprising segments.

Direct drives are coupled directly, i.e. without any transmission interconnected, to working machines. In particular in the case of large-scale machines, such motors are used as ring motors, for example in mills. Such ring motors are known from U.S. Pat. No. 1,224,933 and U.S. Pat. No. 3,272,444. Ring motors are multipole synchronous salient pole motors which are used for low-speed tube mills. In this case, the mill body is used as the hub of the rotor, i.e. the motor is arranged annularly around the mill body. The axial length of the laminate stack of the stator of the ring motor results, for example given predetermined capacity utilization, from the torque required for the mill.

In the case of ring motors with very large diameters, the stator, when viewed in the circumferential direction, is split into a plurality of segments in order to be able to provide the transport to the installation. The assembly of the stator required there in this case entails a plurality of problems since, in the case of conventional drum-coil windings, the winding of the stator cannot yet be completely inserted and checked in the factory. A certain number of drum coils extends over the respective separating joints of the mutually abutting segments and can therefore only be inserted after assembly on the installation.

In order to solve this problem, until now so-called split coils have been provided which have been inserted retrospectively on the installation into the slots of the stator. However, this represents considerable complexity in terms of work, and these split coils form the weakest link in the winding of the stator as a result of the insulation which is subsequently carried out and is required in the end winding region.

SUMMARY OF THE INVENTION

Against this background, the invention is based on the object of providing a direct drive for large-scale drives which can be constructed in a simple manner on the installation without needing to provide insulation on the winding.

The set object is achieved by a direct drive with a stator, which comprises, when viewed in the circumferential direction, a plurality of segments, which each have a terminated winding system, and a rotor comprising segments, which are located on co-rotating working means and interact electromagnetically there with the winding system of the stator.

Advantageously, the coil width of the windings of the stator is a slot pitch. The winding system of the stator therefore comprises tooth-wound coils. The separating joint between in each case two segments of the direct drive runs precisely in one tooth, so that no coils need to be split. Advantageously, this is an unwound tooth, so that no coils need to be fitted on the installation at the intended location of the direct drive. The individual segments can therefore be completely finished and checked as early as in the factory. This results in improved insulation and therefore in increased reliability of these direct drives.

Advantageously, such direct drives for ring motors are used in tube mills or else in excavator drives such as, for example, bucket wheel excavators.

The invention and further advantageous configurations of the invention in accordance with features of the dependent claims will be explained in more detail below with reference to a schematically illustrated exemplary embodiment in the drawing, in which:

BRIEF DESCRIPTION OF THE DRAWING

FIG. 1 shows a conventional winding system of a stator 1 of a ring motor 9 (not illustrated in any more detail), which, for transportation reasons, has a stator 1 comprising segments 3, 4, 5, 6. The windings identified by * are not inserted into their slots 7 during transportation since they extend over the separating joints. They are therefore only inserted into their respective slots 7, insulated and if necessary checked at their intended location.

FIG. 2 shows a view of a ring motor 9, which is supported on pedestals 13. The ring motor 9 has a stator 1, which is shielded from environmental influences, such as dirt etc., by suitable covers and at the same time is used for air cooling and air guidance of the air flow produced by the individual fans 20, 30, 31. The stator 1 is split, for example, into four segments 3, 4, 5 and 6 in the circumferential direction.

Figure 1:
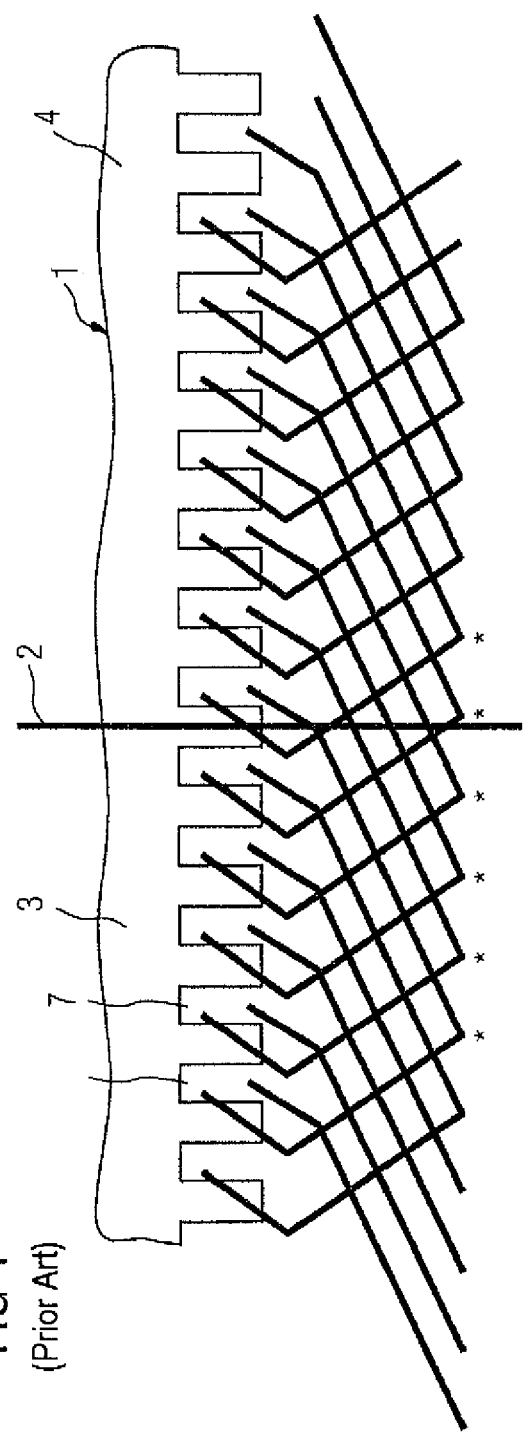
FIG. 1 shows a basic illustration of a conventional winding system.
Figure 3:
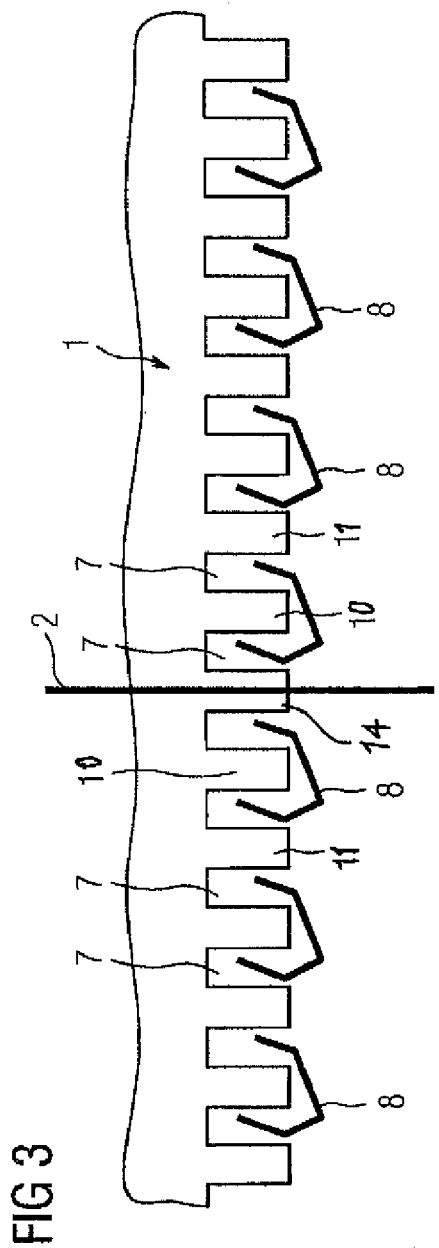
FIG. 3 shows a basic illustration of a winding system according to the invention.
Figure 2:
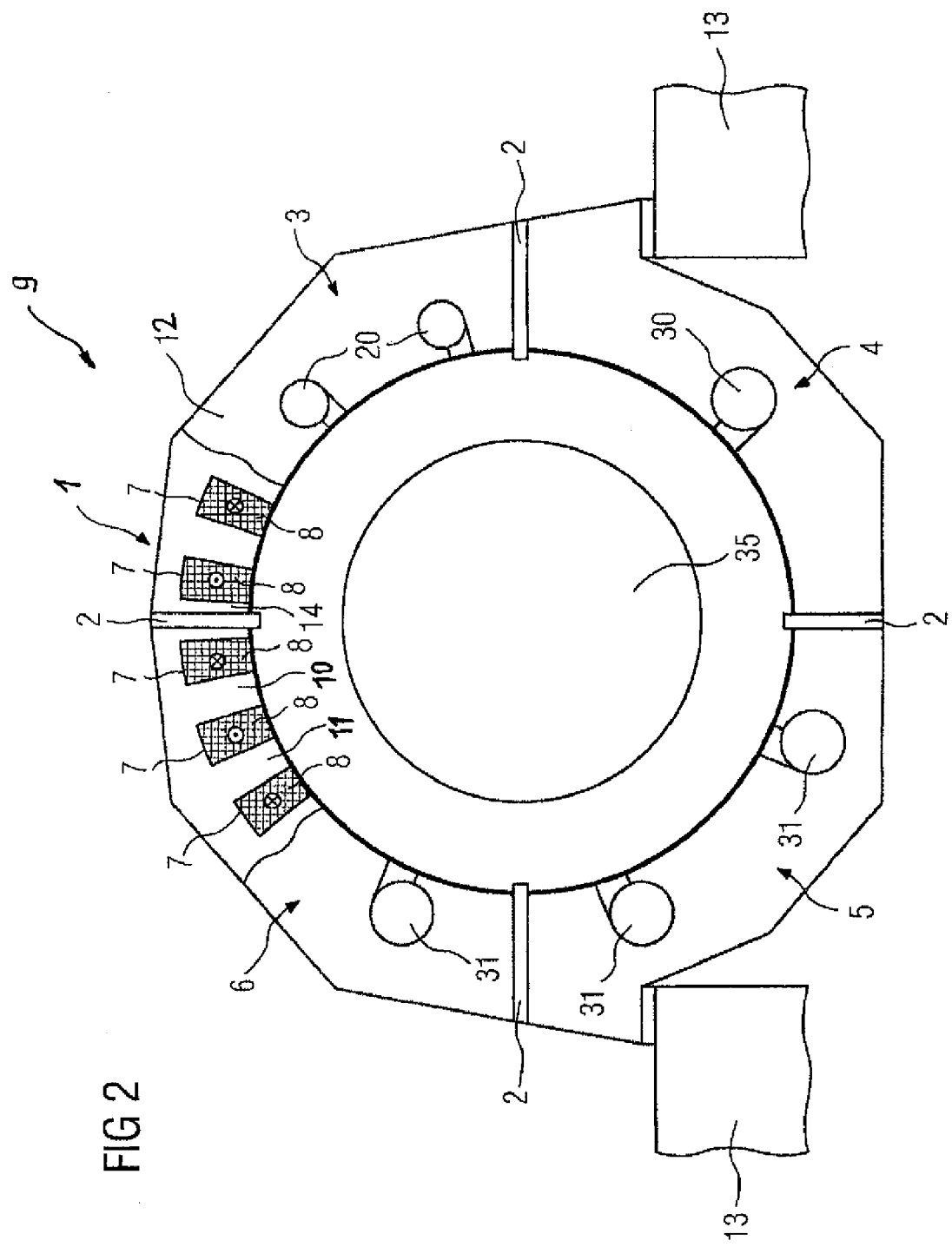
FIG. 2 shows a basic illustration of a ring motor.

In a particularly preferred embodiment, a tooth 14 of the laminate stack 12 of the stator 1 is split in the center at the separating joints 2 between two mutually abutting segments. Coils, advantageously tooth-wound coils 8, are located around every second tooth in slots 7 (not illustrated true to scale) of a segment 3, 4, 5, 6 of the stator 1, so that, when viewed in the circumferential direction, a sequence of wound teeth 10 and unwound teeth 11 results (FIG. 3). The tooth 14 which is split in the center is in this case unwound. The wound teeth 10 are advantageously wider than the unwound teeth 11 and have slot walls with substantially parallel flanks, so that fitting of the tooth-wound coils 8 can be carried out easily from the rotor side.

Advantageously, the tooth-wound coils 8 are fitted to coil formers, which have means for providing fixing on the tooth 10. Furthermore, means are provided which make it possible to make contact with other tooth-wound coils 8 of the same segment in particular in the factory or tooth-wound coils 8 of other segments at their intended location. These are, for example, switching ends of the tooth-wound coils 8 formed especially for this purpose.

The fixing on the tooth 10 takes place, for example, by means of the coil former being latched on the tooth 10. Both the tooth-wound coils 8 themselves and the coil formers with the tooth-wound coils 8, are cohesively joined to their respectively assigned tooth 10 and to the respective segment by means of casting compound, possibly in addition to the latching.

Fixing of the tooth-wound coils 8 can also be achieved by tooth tips which are wider than the tooth stem. In this case, once the tooth-wound coils 8 have been fitted on the tooth stem, for example by means of dovetail-like joints between the tooth tip and the tooth stem, an interlocking connection is produced which is likewise used for fixing the tooth-wound coil 8.

When the ring motor 9 is fitted on the installation at its intended location in the region of the separating joints 2, this therefore does not result in any problems since each segment 3, 4, 5, 6 has a winding arrangement which is terminated in itself and no coils need to be laid on the installation over the separating joints. Each slot 7 of a segment 3, 4, 5, 6 is therefore occupied by at least one coil side of a tooth-wound coil 8.

The terminated winding arrangement can in this case have one or more parts of a phase. That is to say the respective tooth-wound coils 8 of a segment 3, 4, 5, 6 are already interconnected from the factory with the result that advantageously contact need only be made between the individual segments 3, 4, 5, 6 and with one or more converters at the final installation location.

Insulation to be provided retrospectively for the coils on the installation can be dispensed with, and thus the probability of the windings of the direct drive failing is considerably reduced.

In the case of windings which comprise tooth-wound coils 8, the number of holes q is approximately one. The number of holes q is in this case defined as the number of slots per pole and phase, as is known per se.

DESCRIPTION OF PREFERRED EMBODIMENTS

Interconnecting the individual coils, in particular the tooth-wound coils 8 or coil groups of a segment 3, 4, 5, 6 takes place either already in the factory or, if the coils or coil groups are coils or coil groups of different segments, on the installation. The interconnection in this case takes place either directly on the direct drive or on at least one converter assigned to the direct drive. In this case, the types of connections known per se for such direct drives are used.

A rotor 35, which likewise comprises segments (not illustrated in any more detail), is located in the bore of the stator 1, in general the segment of the rotor having four poles. These segments are fixed, for example via flanges, on a working means, for example a mill drum. By means of electromagnetic interaction between the stator 1 and the rotor 35, this working means is now set into a rotational movement during operation.

These direct drives are designed to have at present 50 to 100 poles.

Even in the case of electrically excited synchronous machines with a high pole number and a low number of holes q of the winding system, the concept in accordance with the invention can be used.

These direct drives according to the invention with synchronous motors excited by permanent magnets are suitable in particular for tube mills, such as cement mills and vertical mills and excavator drives. In this case, all the milling and drying processes of a very wide variety of materials can be carried out, such as minerals, cement clinkers, ores and coal, for example.

The outer plate diameters of these stators 1 (which are used in practice at present) of such vertical mills are 9 to approximately 18 meters. The emitted powers in this case are between 10 MW and 30 MW at rotation speeds of between 15 $min^{-1}$ and 9 $min^{-1}$. Even larger diameters with correspondingly higher powers can easily be realized in the future. It is less the technical limitations than the known transportation means and the existing transportation routes which set the limits here. Therefore, in the case of relatively large direct drives the number of segments will increase in future, so that the problem in terms of the separating joints of the segments 3, 4, 5, 6 will intensify without the design in accordance with the invention.

Stators 1 of very large direct drives will in this case in the future be constructed from individual teeth with respectively assigned tooth-wound coils 8, which are assembled mechanically at their intended location and whose tooth-wound coils 8 then only need to be interconnected electrically.

What is claimed is:

1. A direct drive for large-scale drives, comprising:
   a stator including a plurality of circumferentially adjoining segments, each of the segments having pole teeth having a width and two marginal teeth circumferentially delimiting each segment, wherein each of the segments comprises a complete terminated winding arrangement, with every second pole tooth of each segment being wound by a tooth-wound coil to thereby establish a sequence of wound pole teeth and unwound pole teeth, with adjacent marginal teeth of different adjoining segments of the stator in combination always forming a split unwound tooth, and
   a rotor including a plurality of segments which interact electromagnetically with the stator and are operatively connected to a drive-operated working element for rotation with the rotor.

2. The direct drive of claim 1, wherein the direct drive is excited electrically or via permanent magnets.

3. The direct drive of claim 1, wherein the coils of the winding arrangement have a width which corresponds to a slot pitch of the stator.

4. The direct drive of claim 1, wherein the wound pole teeth have a width which is wider than a width of the unwound pole teeth.

5. The direct drive of claim 1, wherein the stator has an outer plate diameter of between 9 and 18 meters.

6. The direct drive of claim 1, wherein the stator has an outer plate diameter of more than 18 meters.

7. A tube mill comprising a direct drive according to claim 1.

8. An excavator drive comprising a direct drive according to claim 1.

* * * * *